United States Patent [19]

Arrazola

[11] Patent Number: 4,515,450
[45] Date of Patent: May 7, 1985

[54] TRANSPARENCY FOR USE WITH A FLYING SPOT SCANNER TO GENERATE IMAGES

[75] Inventor: Ignacio M. Arrazola, Barranquilla, Colombia

[73] Assignee: McDonnell Douglas Corporation, St. Louis, Mo.

[21] Appl. No.: 428,169

[22] Filed: Sep. 29, 1982

[51] Int. Cl.³ ............................................. G03B 21/28
[52] U.S. Cl. ...................................... 353/5; 353/120; 353/122
[58] Field of Search ..................... 353/120, 5, 121, 27, 353/99, 122, 109, 110; 434/44, 37–40; 428/48, 49; 33/1 A

[56] References Cited

U.S. PATENT DOCUMENTS 1,136,236  4/1915  Killman .................................. 352/70
4,193,211  3/1980  Dotsko .............................. 434/38 X
4,427,274  1/1984  Pund et al. ............................ 353/99

FOREIGN PATENT DOCUMENTS

899585  12/1953  Fed. Rep. of Germany .......... 353/5

Primary Examiner—Harry N. Haroian
Attorney, Agent, or Firm—Gravely, Lieder & Woodruff

[57] ABSTRACT

A transparency that is used in a flying spot scanner to generate imagery for simulated flight contains a rectangular center section and eight peripheral sections, four of which lie along the side boundaries of the center section, while the remaining four are at the corners of the center section such that their edges are contiguous to the edges of the side peripheral sections. Each of the nine sections is laid out such that corresponding terrain features lie along opposite margins. This coupled with the fact that all nine sections are identical enables all of the sections to blend together into a mosaic so that the section boundaries within the interior of the mosaic are barely, if at all, discernible. As a consequence, the terrain pattern along any boundary of the center section is repeated along the opposite boundary. A projected raster moves essentially within the center section in response to commands issued from a simulated cockpit. Whenever the projected raster reaches one of the boundaries for the center section, it indexes instantaneously to a corresponding point on the opposite boundary and thereafter continues generally in the same direction of advance. Since the terrain features are identical at the two boundaries, the change is imperceptible, and accordingly, the imagery that is observed from the cockpit gives the illusion of continuous flight.

12 Claims, 6 Drawing Figures

TRANSPARENCY FOR USE WITH A FLYING SPOT SCANNER TO GENERATE IMAGES

BACKGROUND OF THE INVENTION

This invention relates in general to flight simulation, and more particularly, to an improved illustration of terrain for use in a flight simulator of the flying spot scanner variety and a process for illustrating terrain features such that the resulting illustration may be used for flight simulation.

Flight simulators, which are used extensively in training and qualifying pilots for commercial as well as military aircraft, require a display that represents the view from the cockpit of an aircraft in flight. This display appears in front of the cockpit and must change or move to simulate forward motion of an aircraft. It must further change in response to manipulation of controls that affect aircraft direction, altitude, pitch angle, and roll angle. Some displays take the form of imagery which is projected onto a spherical screen or dome that completely surrounds the simulated cockpit. Other displays take the form of imagery that appears on a television monitor located in front of the simulated cockpit.

The images that comprise the display may be derived from several sources, one of the least complicated being a television system that employs a flying spot scanner. In this system a CRT raster is projected upon and moves over a transparency that is a simple aerial photograph or perhaps a mosaic composed of a multitude of aerial photographs. The position of the projected raster on the transparency is controlled by a computer which responds to commands given by a pilot in the simulated cockpit. That portion of the transparency through which the raster projects is reproduced as an image on the screen or monitor, with appropriate corrections made electronically for pitch angle, roll angle, yaw angle, and altitude. The aircraft position coordinates, that is the location of the projected raster on the transparency, may be controlled electronically if the transparency is small enough. Otherwise, they are controlled by "X" and "Y" servo motors which move the transparency.

The basic flying spot scanner system possesses several major disadvantages. First, it occupies considerable space because the transparency is either in the form of a roll, usually about 6 inches wide and several feet long, or else in the form of a square plate, some measuring about 4×4 feet. Secondly, images are rarely orthonormal, because the aerial photographs from which they are derived are not orthonormal throughout. In this regard, every portion of the scene should be presented as if viewed from directly above, but aerial photographs covering large areas do not conform with this objective. Third, the flying spot scanner does not afford adequate contrast, at least when a projected image is employed. In this regard, aerial photographs contain many shades of gray or other regions of low contrast. These areas exhibit greater contrast at simulated high altitude flight than at simulated low altitude flight, which is opposite of what happens in actual flight. In other words, as an aircraft descends in actual flight, the scene observed by the pilot will increase in contrast, and not decrease as will occur with a flying spot scanner system. The problem is particularly acute with systems that project images onto dome-shaped screens, for the screens must have matte surfaces, that is, surfaces which are diffuse and not too highly reflective, to avoid nonuniform and excessive reflections within the domes themselves. Such reflections will of course reduce the contrast significantly. In this same vein, the image quality derived from conventional flying spot scanner systems is not very good. The same holds true with regard to image control, particularly where the transparency is a mosaic, for it is difficult to conceal the boundaries of the individual photographs that comprise the mosaic. Indeed, while aerial photographs are readily available from the Federal government, selection of the appropriate photographs and piecing them together into a workable mosaic is a difficult and burdensome task.

SUMMARY OF THE INVENTION

One of the principal objects of the present invention is to provide an illustration for a flight simulation system that employs a flying spot scanner. Another object is to provide an illustration of the type stated in nature of a transparency in which every region of the transparency is orthonormal to the camera or photomultiplier tube that observes it. A further object is to provide a transparency of the type stated which produces an image of extremely high contrast, even for simulated low altitude flight. An additional object is to provide a method of forming a transparency having repeating terrain features and contrast characteristics that render it suitable for use in a flight simulation system. These and other objects and advantages will become apparent hereinafter.

DESCRIPTION OF THE DRAWINGS

In the accompanying drawings which form part of the specification and wherein like numerals and letters refer to like parts wherever they occur.

DETAILED DESCRIPTION

Referring now to the drawings, a flight simulation system A (FIG. 1) includes a dome 2 that is almost a full sphere and has a reflective interior surface 4, the surface 4 being preferably white matte in texture so that an image of simulated terrain and sky may be projected onto it without excessive reflections within the dome 2 itself. At the center of the dome 2 is a simulated cockpit 6, and behind the cockpit 6 the dome 2 contains an aperture 8 through which a beam of light projects. This light beam contains images that come into focus on the interior surface 4 of the dome 2, forming a real image that occupies much of the surface 4 in front of the cockpit 6. Indeed, the projected field of view is about 180°.

Figure 1:
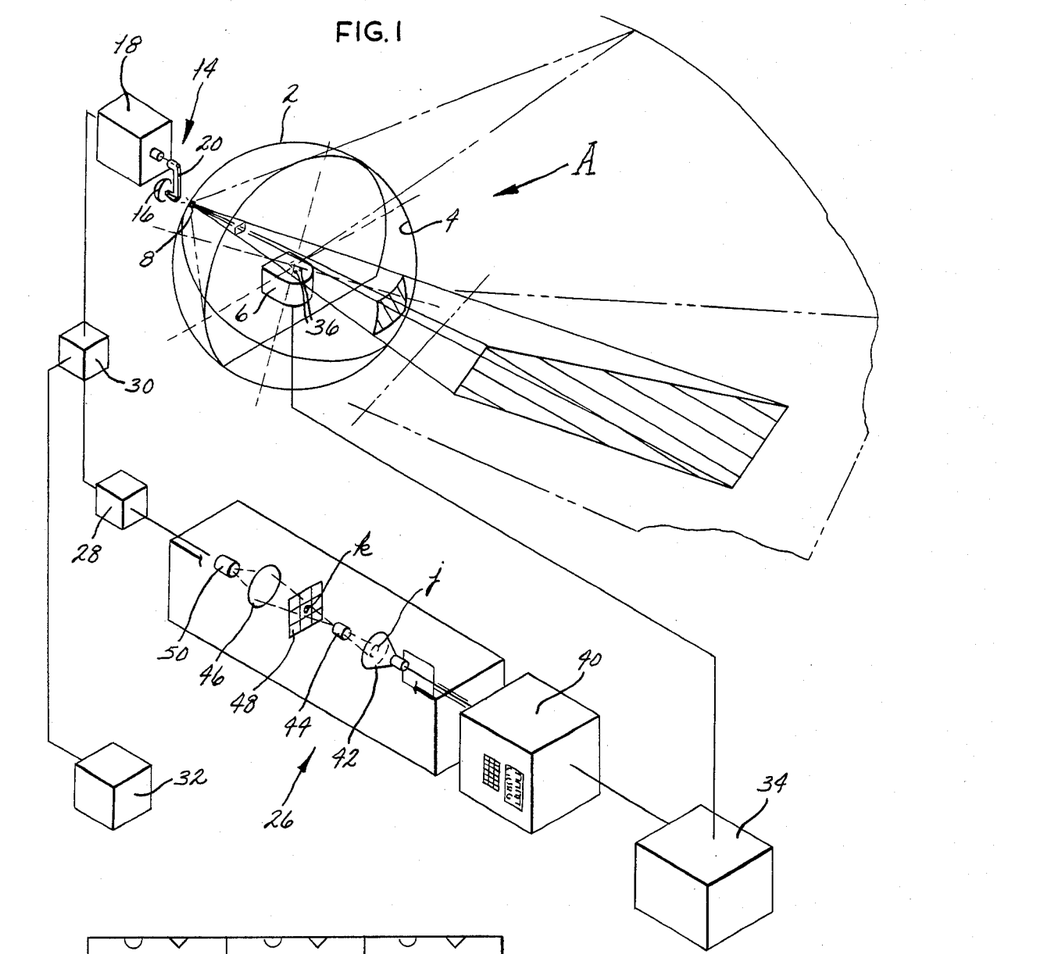
FIG. 1 is a schematic view of a flight simulation system of the flying spot scanner type that uses a transparency constructed in accordance with and embodying the present invention.

Actually, the cockpit 6 is positioned such that the pilot's eyes are at about the center of the dome 2, while the aperture 8 is located somewhat higher than the cockpit 6, so that the shadow cast by the cockpit 6 does not fall in the portion of the surface 4 that is located directly in front of the pilot. Instead, the shadow falls somewhat below the front of the cockpit 6 where it is obscured from the pilot's view by the cockpit 6 itself.

The light which is projected through the aperture 8 originates at a projection system 14 including a concave mirror 16 of spherical or ellipsoidal configuration having its reflective surface presented toward and aligned with the aperture 8, a light valve projector 18 that is offset from the mirror 16, and a probe-relay 20 which in effect optically couples the offset projector 18 and the mirror 16 such that a beam of light emitted by the projector 18 is cast upon the mirror 16 which in turn reflects the light so that it passes through the aperture 8 in the dome 2. The projector 18 produces a real image that is essentially planar, but the probe-relay 20 includes, among other lenses, a fish eye lens which distorts the planar image into a spherical image—one that comes into focus on the surface 4 of the dome 2 to occupy much of the hemisphere in front of the cockpit 6. U.S. patent application Ser. No. 254,417 of M. L. Pund and J. A. Van Hoogstrate, Jr., filed Apr. 15, 1981, now U.S. Pat. No. 4,427,274 discloses a "Wide Angle Projection System" suitable for use as the projection system 18.

The light valve projector 18 is connected to a flying spot scanner 26 which generates electrical signals that are converted by the projector 18 into a general terrain scene, and this scene of course, passes through the projection system 14 to be cast as a real image on the surface 4 of the dome 2. The electrical signal generated in the scanner 26 is amplified at an amplifier 28 which is located between the scanner 26 and the projector 18 and is further modified by additional electrical signals which are introduced at a video mixer 30. These additional electrical signals are derived from a special effects generator 32 that is connected to the mixer 30 and may introduce sky, a haze band, clouds, and other enhancement into the general terrain scene that is created at the scanner 26.

The flying spot scanner 26 is electrically connected to a computer 34 which in turn is connected to simulated aircraft controls 36 in the cockpit 6. The computer 34 generates signals that impart simulated motion, and in response to commands derived from the controls 36 it generates further signals that correspond to pitch angle, heading angle, altitude, roll angle, and position (X distance and Y distance).

The flying spot scanner 26 includes a raster generator 40 which creates a raster on a cathode-ray tube 42 that also forms part of the scanner 26. In front of the cathode-ray tube 42 is an object or relay lens 44 through which the light cast by the raster on the cathode-ray tube 42 passes, irrespective of its position on the face of the tube 42. The objective lens 44 in turn aligns with a condensing lens 46, and between the two lenses 44 and 46 is a transparency 48 that in a sense resembles a high altitude aerial photograph, although it is not. In any event, the raster is cast upon the transparency as a projected raster k which in effect occupies and illuminates a very limited area on the transparency 48. The terrain features within this area are imparted to the projected raster k, thereby modulating the projected raster k. The condensing lens 46 casts the modulated raster onto a photomultiplier tube 50 which converts the modulated raster and terrain features contained within it into an electrical signal. That signal, after being modified at the video mixer 30, is converted into a video display at the light valve projector 18, and that display is of course cast as a real image on the surface 4 of the dome 2.

Figure 5:
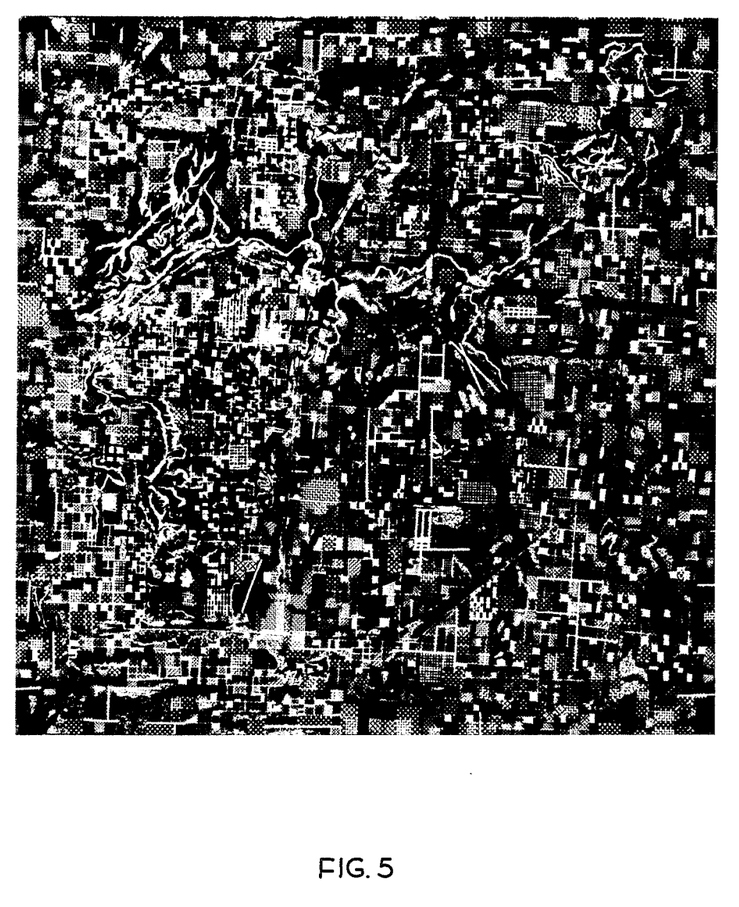
FIG. 5 is a photograph of an actual prototype illustration produced in accordance with the technique illustrated in FIG. 3.

The transparency 48 contains a multitude of different geometric shapes arranged to resemble terrain that is viewed orthonormally (FIG. 5). Among the geographic patterns that may be employed are circles, squares, rectangles, trapezoids, and lines, as well as various nondescript shapes. The shapes themselves may be arranged in various patterns. For example, squares may be arranged in a checkerboard pattern to perhaps resemble a city or village block containing buildings or to resemble planted fields. The type of shapes employed and the patterns in which they are arranged depend on the type of terrain one attempts to simulate. For example, the shape and patterns used to simulate farmland will differ from those used for a desert. In any event, the spatial frequencies of the patterns should be such that they do not give rise to unwanted Moiré effects in the image that is cast upon the dome 2. Moreover, the shapes and patterns are either highly transparent or opaque and are well defined, that is bordered by clear and distinct edges. Hence, the transparency 48 contains essentially no shades or gray. In short, it is binary.

In a sense it is desirable to have the shapes and patterns somewhat nondescript so that the transparency does not contain easily recognizable features. On the other hand, where the simulated flight is to include air-to-ground missions, the transparency should have a recognizable feature to serve as a target.

Figure 2:
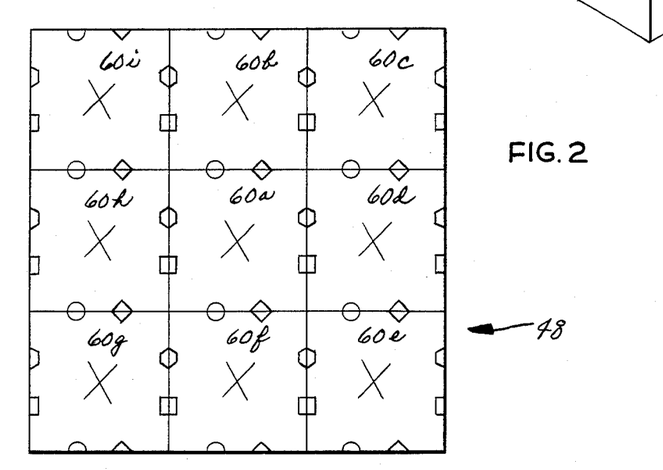
FIG. 2 is a schematic view of a transparency composed of nine identical sections arranged in a mosaic, all in accordance with the present invention.
Figure 3:
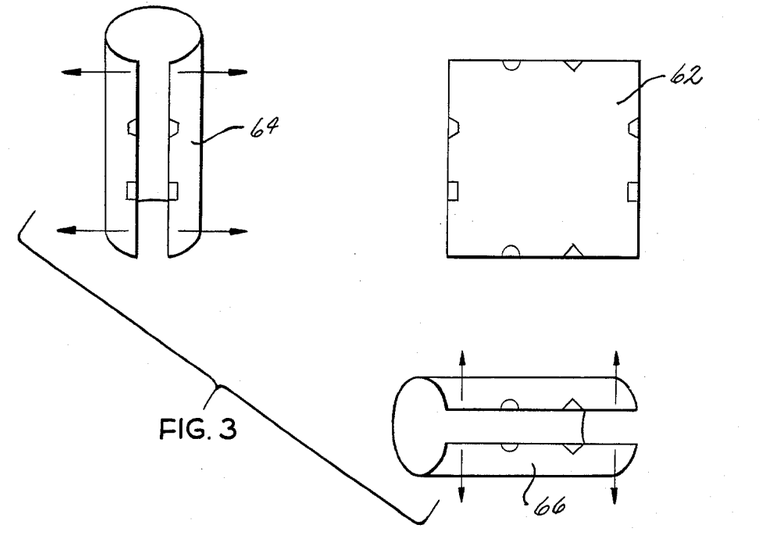
FIG. 3 is a composite view illustrating the method of preparing a prototype section from which the mosaic of FIG. 2 is constructed.
Figure 6:
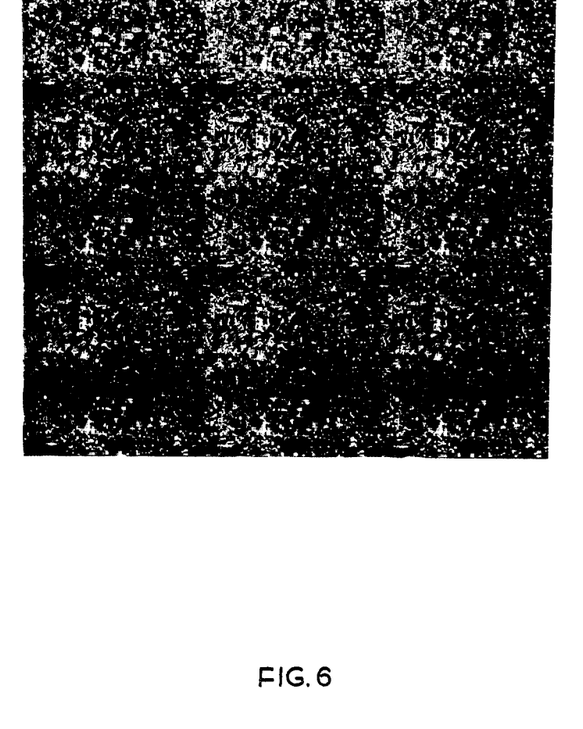
FIG. 6 is a photograph of a mosaic transparency formed from the section illustrated in FIG. 5.

The indicia on the transparency 48 is arranged to form a mosaic composed of nine rectangular units or sections are identical in size and content (FIG. 2). Each section 60 is preferably square, and the nine sections 60 are arranged such that one is in the center, and the remainder surround it. Thus, the mosaic consists of a center section 60a and, arranged clockwise around the center section 60a, a top section 60b, an upper right corner section 60c, a right section 60d, a lower right corner section 60e, a bottom section 60f, a lower left corner section 60g, a left corner section 60h and an upper left corner section 60i. Not only are the nine sections 60a–i identical, but the opposite margins of each in general correspond, or at least each section 60 along its opposite boundaries contains identical shapes and arrangements of shapes. For example, along its left and right boundaries each section 60 is in essence identical, and the same holds true along the top and bottom boundaries. The correspondence is such that if the section 60 is folded to bring opposite margins together, the terrain pattern will blend at the boundaries and appear continuous (FIG. 3). This enables the top boundary of the center section 60a to correspond with the bottom boundary of the top section 60b, so that the two sections 60a and 60b blend together at those boundaries without any discontinuities. In short, the boundaries are barely, if at all, discernible in the transparency 48 (FIG. 6). Likewise, the right boundary of the center section 60a blends into the left boundary of the right section 60d without any noticeable line of demarcation. Similarly, the right boundary of the top section 60b and the upper boundary of the right section 60d blend, respectively, into the left and bottom boundaries of the upper right corner section 60c. Indeed, all four sections 60a, 60b, 60c, and 60d blend into each other where their corners meet, that is at the upper right hand corner of the center section 60a. Thus, that corner is barely, if at all, discernible.

The same matching of boundaries and corners occurs around the entire periphery of the center section 60a. As a result, the four boundaries of the center section 60a are not discernible, and the top section 60b, the right section 60d, the bottom section 60f and the left section 60h merely appear to be continuations or extensions of the center section 60a (FIG. 6). However, upon close inspection, it becomes apparent that each of the sections 60b, d, f, and h, while blending nicely into the center section 60a, is actually a duplicate or repetition of the center section 60a.

In one very practical procedure for producing the transparency 48, a prototype 62 (FIG. 5) of a single section 60 is prepared on a somewhat flexible material such as paperboard, but in size the board is considerably larger than an actual section 60. For example, the entire transparency 48 consisting of the nine identical sections 60 may measure only 3×3 inches, whereas the prototype 62 for a single section 60 may measure 20×20 inches. The desired pattern is then laid out on the sheet of paperboard, beginning at the center and working outwardly to the four margins and corners. The various shapes which comprise the pattern may be printed on the paperboard in a highly contrasting color such as black on white, or they may be cut from different and highly contrasting paper or other material and applied to the paperboard. Indeed, the shapes, or at least some of them, may be derived from a material sold at artist supply stores under the name Zipatone. This material comes in various geometric shapes and has an adhesive backing which enables it to be applied very easily to the paperboard of the prototype 62.

As the pattern nears the margins, the paperboard of the prototype 62 is bent backwardly into a cylinder 64 (FIG. 3) and joined together along its left and right margins such as by means of adhesive tape. The production of the pattern is now continued until it extends completely around the cylinder 64. Thus, the pattern extends across the left and right margins. Next, the cylinder is cut apart along the left and right margins so that those margins are again detached. Even so, the left and right margins are in a sense identical or at least have corresponding terrain features or patterns along the cut.

The same procedure is repeated with regard to the top and bottom margins, that is to say the paperboard of the prototype 62 is again folded into a cylinder 66, but this time the axis of the cylinder is parallel to the top and bottom margins of the prototype 62 (FIG. 3). Then the pattern is completed so that it extends across the top and bottom margins and indeed the pattern is continued outwardly into the corners, with special care being taken to insure that the left and right, as well as the top and bottom margins, blend at the corners. Next the cylinder is cut to separate its top and bottom margins, but again the pattern remains identical or in correspondence along those separated margins.

Once the prototype 62 is completed, it is photographed and nine high contrast prints of the photograph are made. The photographic reproduction involves a reduction in size, but even so, each of the nine prints is equal in size. The prints are then fitted together into a mosaic with care being exercised to match margins so that the pattern blends across the margins. The mosaic is in turn photographed, the photographic negative that is derived constituting the transparency 48 (FIGS. 2 and 6). To insure good contrast, high resolution photographic film should be used, preferably a film that possesses a resolution of about 2000 line pairs per millimeter. Also, the emulsion of the film should be on a glass plate.

Figure 4:
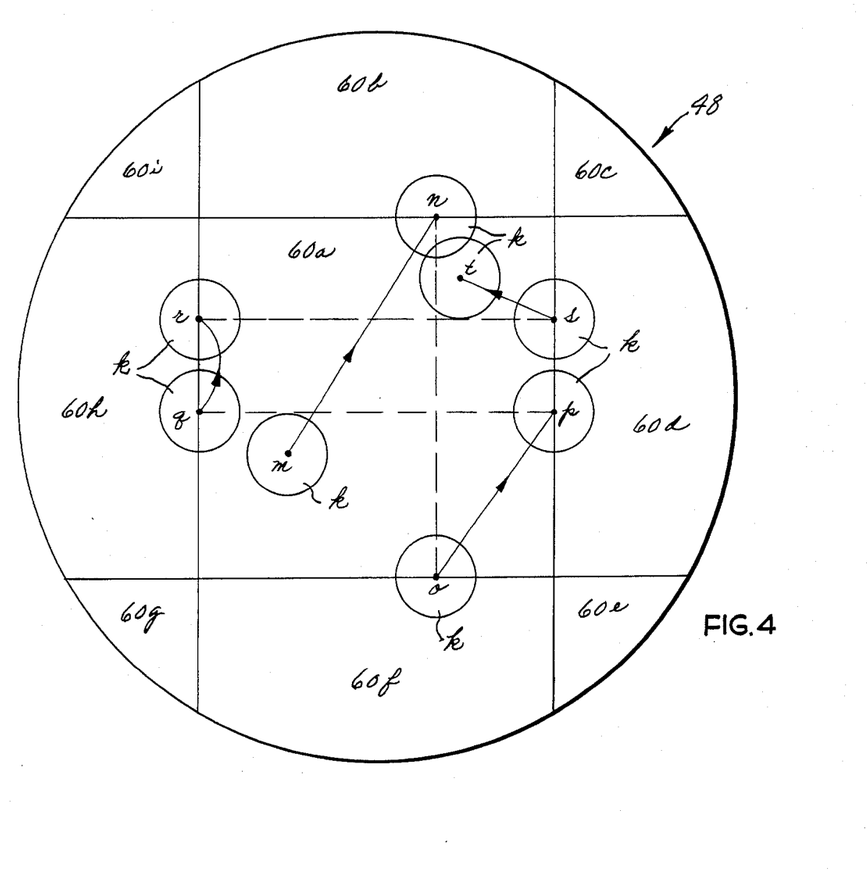
FIG. 4 illustrates a possible path that the projected CRT raster of the flying spot scanner may follow over essentially the center section of the mosaic transparency.

Thus, the resulting transparency 48 has nine sections 60, namely the center section 60a and the eight peripheral sections 60b, c, d, e, f, g, h, and i that surround it (FIG. 2). When the transparency 48 is properly positioned between two lenses 44 and 46, its center section 60a lies along the common optical axis of the lenses 44 and 46. Moreover, the raster is, after passing through the objective lens 44, considerably smaller than the center section 60a so that the projected raster k which is cast upon the transparency 48 is considerably smaller than the center section 60a. The computer 34 moves the projected raster k basically within the confines of center section 60a, although when the projected raster k approaches any one of the four boundaries of the center section 60a, it does lap over onto that peripheral section 60 that is contiguous at the particular boundary (FIG. 4). Of course, as the projected raster k moves over the center section 60a of the transparency 48 it is modulated in the sense that the simulated terrain features in the illuminated region of the transparency 48 are embodied in it. The modulated raster passes through the condensing lens 46 and is cast onto the photomultiplier tube 50, where the terrain image that is embodied in it is converted into an electrical signal. This electrical signal is in turn converted into a visual display by the light valve projector 18, that display being projected onto essentially the front hemisphere of the dome 2. Indeed, the reflective surface 4 in front of and generally below the cockpit 6 is illuminated with the simulated terrain features which exist at the particular location at which the projected raster k is located on the center section 60a of the transparency 48. Since it is primarily high altitude flight that is being simulated, the patterns provide a very realist scene, one that closely resembles the view of the terrain a pilot would have from the cockpit of a high altitude aircraft. Actually, the pattern derived from the transparency 48 is modified at the special effects generator 32 so that a sky and horizon are incorporated into it, along with a haze band immediately above the horizon.

The projected raster k is given motion by the computer 34 and this translates into movement of the imagery over the illuminated portion, that is the front hemisphere, of the reflective surface 4. As a consequence, the pilot in the cockpit 6 experiences a sensation of motion. Of course, the speed of the simulated flight is dependent on the speed at which the projected raster k moves over the transparency 48.

The direction that the projected raster k takes, or more accurately the path along which it moves, while in one sense being controlled by the computer 34, is in a larger sense determined by the pilot manipulating the controls 36 in the cockpit 6. Thus, if the pilot wants to turn during a simulated flight, he moves the controls accordingly and the projected raster k experiences a change in direction on the center section 60a of the transparency 48, with that change corresponding to the command executed through the controls 36. The change in direction is picked up at the photomultiplier tube 50 and as a consequence the light valve projector 18 casts an image that reflects the change in direction. Thus, the pilot in the cockpit 6 instantly observes the change in direction effected by the manipulation of the controls 36.

The pilot can likewise command a change in the altitude by manipulating the controls 36, and this causes the computer 34 to either enlarge or reduce the size of the projected raster k. For example, when the pilot commands a descent, the projected raster k concentrates on a smaller area of the transparency 48 and the image of that smaller area is cast onto the photomultiplier tube 50 and likewise onto the reflective surface 4 of the dome 2. Of course, the geographic shapes, because of the lower level of the flight are much enlarged on the surface 2, but even so they appear without significant loss of contrast because of the high resolution film and the binary nature of the transparency 48. In short, the transparency 48 either allows light to pass or it does not, so the high contrast is maintained even at simulated moderate and low level flight. Aerial photographs, on the other hand, have regions of varying contrast and these regions, when illuminated by a flying spot raster which is reduced in size to depict low level flight, exhibit a distinct lack of contrast which is just the opposite from normal flight where contrast is greater at low level flight.

The pitch angle is likewise under the ultimate control of the pilot who by manipulating the controls 36 can cause the computer 34 to change the projected image to simulate changes in pitch of the aircraft, this being effected by changes in the raster.

The roll angle is also controlled by the pilot at the cockpit 6. By manipulating the appropriate controls 36 the pilot directs the computer 34 to turn or rotate the scanner CRT raster which in turn defines rotation of the image that is projected from the light valve projector 18. As a consequence, the horizon and terrain turn from their normal horizontal disposition. This simulates rotation of an aircraft about its longitudinal axis, which is of course roll.

In any event, the projected raster k which is projected from the cathode-ray tube 42 moves over the center section 60a of the transparency 48 in response to electrical signals from the computer 34 which in turn receives commands from the pilot in the simulated cockpit 6. While the pilot may and usually does direct a continuous flight over what he perceives as a substantial distance, the projected raster k, for all intents and purposes, does not leave the center section 60a of the transparency 48. Instead, it makes successive passes over the center section 60a indexing whenever it reaches a boundary of the center section 60a. In this regard, it will be recalled, that opposite boundaries of the center section 60a in essence correspond, so that when the projected raster k reaches one boundary, the terrain features it illuminates at that boundary will also appear along the opposite boundary. The computer 34 merely brings the projected raster k back to the corresponding point at the opposite boundary and continues to advance the raster k over the center section 60a from that point. The indexing, that is the transposition of the projected raster k to the opposite boundary, is instantaneous, so there is no discernible disruption in the flight scene that is cast on the surface 4 of the dome 2. Further contributing to the apparent continuity of the simulated flight are the eight peripheral sections 60b–i. Each of the peripheral sections 60b–i has inner boundaries, and some of these inner boundaries lie along the boundaries of the center section 60a, while others lie along the inner boundaries of other peripheral sections 60b–i.

Any peripheral section 60b–i along one of its inner boundaries forms a continuation of the terrain features for the section 60 with which it is contiguous and further reproduces those terrain features along its opposite boundary. Thus, as the projected raster k reaches a boundary of the center section 60a, it will project terrain features from the center section 60a and from one or more of the peripheral sections 60b–i as well. However, the terrain features on the peripheral section are the same as along the opposite boundary of the center section 60a, so that when the projected raster k indexes, the same terrain images appear, although they are derived from a different region of the transparency 48. The computer 34 automatically indexes the projected raster k whenever its center reaches one of the boundaries of the center section 60a, this being effected by electronic switching of the raster in the raster generator 40. The raster generator circuits include a boundary hystereois feature which prevents rapid oscillatory reset indexing across the center sections 60a during flights along its boundaries.

By way of example (FIG. 4), a simulated flight may begin, at least insofar as the transparency 48 is concerned, at point m, which is within the center section 60a, and may proceed along vector m, n to point n, which is along the top boundary of the section 60a. At point m the projected raster k lies entirely within the confines of the center section 60a, and thus the entire scene that is projected onto the dome 2 is derived from the center section 60a. On the other hand, at point n, the projected raster k lies essentially half within the center section 60a and half within the top section 60b and the projected image is derived from both sections 60a and 60b. However, the terrain at point n is identical to the terrain at point o along the opposite or lower boundary of the center section 60a, directly beneath the point n. When the center of the projected raster k reaches point n, the computer 34 instantaneously switches the raster k to point o where it illuminates small portions of both the center section 60a and the bottom section 60f. The switching occurs during the time that the electron beam in the CRT tube 42 is blank, that is during the scan retrace time which is about 1.5 milliseconds. That time is so short that the transposition that occurs during it is not detected by the human eye. Thus, in spite of the indexing, the terrain projected onto the surface 4 of the dome 2 appears continuous.

Assuming that the pilot does not alter the direction of the simulated flight, the projected raster k continues along the vector o,p which is parallel to the vector m,n and passes the same terrain features as an extension of the vector m,n into the top section 60b. When the projected raster k reaches the point p along the right boundary, essentially half of it illuminates the center section 60a and half the right section 60d. At point p, the computer 34 indexes the raster k bringing it instantaneously left to point q which is along the left boundary of the center section 60a. The terrain features at point q, however, are identical to the terrain features at point p, so the simulated flight continues without any apparent disruption.

Beyond point q the pilot may manipulate the controls 36 and cause the projected raster k, and the course of the flight to veer sharply to the left boundary, whereupon the projected raster k will again become centered over the left boundary at point r. At that instance the computer 34 indexes the projected raster k, bringing it right to the point s where the flight continues along the vector s,t.

While simulated flights that are derived from an aerial photograph are limited by the boundaries of the photograph, the duration of a simulated flight provided by the system A is without limit. Moreover, the entire simulated flight is derived from the small transparency 48, which need not move, for all of the movement is obtained from the motion of the projected raster k essentially within the center section 60a. Thus, no complicated devices are required to hold large aerial photographs or a mosaic that may be on scrolls. Even though the scene projected onto the surface 4 of the dome 2 may repeat, the features can be sufficiently nondescript so as not to be remembered by the pilot, and hence he will not be aware of the repeating nature of the terrain over which the simulated flight passes.

The shapes which comprise the terrain features on the transparency 48 are orthonormal at every point on the transparency 48, so no distortion of the type experienced with aerial photographs results.

While flying spot scanner 26 and the transparency 48 within it have been described in conjunction with the flight simulator dome 2 and the projection system 14 for casting images of terrain on the surface 4 of the dome 2, the dome 2 and projection system 14 may be replaced with a single television monitor located in front of the cockpit 6. However, the simulated flight would not appear as realistic.

Also, the transparency 48 need not have the peripheral sections 60b-i in complete rectangular form, but instead may be circular since only those portions of the peripheral sections 60b-i that are adjacent to the center section 60a are illuminated anyway (FIG. 4).

This invention is intended to cover all changes and modifications of the example of the invention herein chosen for purposes of the disclosure which do not constitute departures from the spirit and scope of the invention.

What is claimed is:

1. In combination with an apparatus for visually simulating flight and including a source of light which is designed to be projected on and to scan over an illustration of terrain or simulated terrain, the source of light being capable of indexing instantaneously from one region of the illustration to another region, and means for producing an image of the region of the illustration illuminated by the source of light, an improved illustration of the terrain positioned where the source of light will illuminate it and may scan over it, said illustration comprising: a center section having opposite boundaries along which the terrain features generally correspond so that the two opposite boundaries if brought together will illustrate continuous terrain features, and peripheral side sections located along the opposite boundaries of the center section, each peripheral side section along that of its boundaries where it is contiguous to the center section having terrain features that correspond with the terrain features along the adjacent boundary of the center section, so that the peripheral side sections blend into the center section at the common boundaries between the center and peripheral side sections, the illumination from the source of light upon moving to a point on one of the opposite boundaries of the center section, instantaneously transposing to the corresponding point along the opposite boundary of the center section and continuing the movement therefrom through the center section, whereby the image produced by the means for producing an image provides an illusion of continuous flight.

2. The combination according to claim 1 wherein the illustration of the terrain is a transparency.

3. The combination according to claim 2 wherein the transparency is binary in the sense that it has areas that are either substantially transparent or substantially opaque.

4. The combination according to claim 1 wherein the center section of the illustration has two sets of parallel boundaries, and at least one peripheral side section lies along each of the four boundaries of the center section.

5. The combination according to claim 4 wherein the center section is rectangular.

6. The combination according to claim 5 wherein additional peripheral sections are at the corners of the center section and along end boundaries of the side peripheral sections.

7. The combination according to claim 6 wherein each corner peripheral section, where it lies along the boundary of a side peripheral section, has terrain features that correspond to the terrain features along those boundaries of the side peripheral sections the corner peripheral section lies, so that the side and corner peripheral sections blend together at their boundaries.

8. The combination according to claim 7 wherein the center section, the side peripheral sections, and the corner peripheral sections are all identical.

9. In combination with an apparatus for visually simulating flight by scanning an illustration of terrain or simulated terrain and including scanning means that scans the illustration, responding in direction to commands of one who experiences the simulated flight, the scanning means being capable of indexing at predetermined locations within the illustration, the apparatus further including means for producing an image of the portion of the illustration to which the scanning means is directed at any instant, an improved illustration of the terrain positioned where it may be scanned by the scanning means, said illustration comprising: a center section having opposite boundaries along which terrain features generally correspond so that the two opposite boundaries if brought together will illustrate continuous terrain features, and contiguous peripheral sections located along the opposite boundaries of the center section, each contiguous peripheral section along that of its boundaries where it is contiguous to the center section having terrain features that correspond with the terrain features along the adjacent boundary of the center section, so that the contiguous peripheral sections blend into the center section at the common boundaries between the center and peripheral sections, the scanning means upon scanning to a point where it is directed at one of the opposite boundaries of the center section, then instantaneously indexing the scan so as to be directed at the corresponding point along the opposite boundary of the center section and continuing the scan through the center section therefrom, whereby the image that is produced gives the illusion of continuous flight.

10. The combination according to claim 9 wherein the center section has two sets of parallel boundaries and a contiguous peripheral section lies along each of the four boundaries.

11. The combination according to claim 10 wherein the improved illustration also comprises corner peripheral sections which are at the corners of the center section; and wherein the corner peripheral sections and the contiguous peripheral sections are contiguous along end boundaries where the corner and contiguous peripheral sections have corresponding terrain features so as to blend into each other.

12. The combination according to claim 11 wherein the center section is rectangular.

* * * * *

UNITED STATES PATENT AND TRADEMARK OFFICE
CERTIFICATE OF CORRECTION

PATENT NO. : 4,515,450
DATED : May 7, 1985
INVENTOR(S) : Ignacio M. Arrazola

It is certified that error appears in the above-identified patent and that said Letters Patent are hereby corrected as shown below:

Column 4, line 37, "60 that" should be inserted after "sections".

Signed and Sealed this

Third Day of September 1985

[SEAL]

Attest:

DONALD J. QUIGG

Attesting Officer    Acting Commissioner of Patents and Trademarks - Designate